United States Patent [19]
Zaccarini

[11] Patent Number: 5,516,038
[45] Date of Patent: May 14, 1996

[54] PACKAGING CONTAINERS, PARTICULARLY SUITABLE FOR PASTA, RICE, AND OTHER DRY FOOD PRODUCTS

[75] Inventor: Antonietta Zaccarini, Fratta Terme, Italy

[73] Assignee: Corticella Molini E Pastifici S.p.A., Bologna, Italy

[21] Appl. No.: 331,841

[22] Filed: Oct. 31, 1994

[30] Foreign Application Priority Data

Nov. 12, 1993 [IT] Italy ................................. F093A0021
Feb. 18, 1994 [IT] Italy ................................. F094A0002

[51] Int. Cl.$^6$ ............................... B65D 5/42; B65D 5/72
[52] U.S. Cl. ........................... 229/162; 73/426; 215/365; 206/769; 229/125.12; 229/218; 229/220; 229/243
[58] Field of Search ............... 229/125.06, 125.12, 229/162, 218, 220, 229, 243; 215/365; 206/45.31, 45.34; 220/663, 664; 73/323, 426, 427; 222/157, 158

[56] References Cited

U.S. PATENT DOCUMENTS

| | | | |
|---|---|---|---|
| 303,422 | 8/1884 | DeLong | 215/365 |
| 2,107,613 | 2/1938 | Kotcher et al. | 206/45.31 |
| 2,153,911 | 4/1939 | Benedetti | 206/45.31 |
| 2,177,918 | 10/1939 | Vogt et al. | 206/45.31 |
| 2,294,473 | 9/1942 | Makeley | 229/162 |
| 3,065,915 | 11/1962 | Samann | 206/45.31 |
| 3,322,265 | 5/1967 | Collura | 206/45.31 |
| 3,490,678 | 1/1970 | James et al. | 206/45.31 |
| 3,530,722 | 9/1970 | Miller | 73/427 |
| 3,799,428 | 3/1974 | Lamming | 206/45.34 |
| 4,213,536 | 7/1980 | Hafner | 220/663 |
| 4,290,523 | 9/1981 | Wallace | 206/45.31 |
| 4,846,394 | 7/1989 | Swanson | 229/162 |
| 5,197,625 | 3/1993 | Mullaney | 229/162 |

FOREIGN PATENT DOCUMENTS

| | | | |
|---|---|---|---|
| 187334 | 7/1986 | European Pat. Off. | 229/162 |
| 993163 | 10/1951 | France | 73/426 |
| 1469103 | 1/1967 | France | 222/157 |
| 763770 | 12/1956 | United Kingdom | 206/45.31 |

*Primary Examiner*—Gary E. Elkins
*Attorney, Agent, or Firm*—Guido Modiano; Albert Josif

[57] ABSTRACT

In a box which is made of cardboard or other rigid material and has a rectangular prism-like shape, one or two opposite faces have an inspection port which is closed with transparent material and is flanked by a graduated scale used to determine, according to the level reached after one or more partial removals, the weight of the short pasta or rice left in the box and any corresponding calories. The removal outlet, closed by a tear-open tab, is provided in one of the two faces that are normal to the face or faces provided with the inspection port and the graduated scale; the handle that makes it easier to grip the box protrudes on the opposite face. In the dosage container for short pasta or rice and in the dosage container for spaghetti or other long pasta, both made of cardboard or other opaque rigid material, there are one or more inspection ports which are made of transparent material and are shaped and/or arranged so as to directly form the sequence of elevation references, proximate to which the corresponding weight of the product and optionally the number of calories are indicated.

20 Claims, 10 Drawing Sheets

PACKAGING CONTAINERS, PARTICULARLY SUITABLE FOR PASTA, RICE, AND OTHER DRY FOOD PRODUCTS

BACKGROUND OF THE INVENTION

The present invention relates to some original solutions devised mainly to give a new additional function to the rigid containers, specifically cardboard boxes, that are normally used to package pasta, rice, and other dry food products.

Generally, even in the smallest sizes, the quantity of the contents is such as to presume consumption over a period of time.

SUMMARY OF THE INVENTION

The aim of the present invention is to provide containers in which it is possible to immediately know how much product is available, after taking part of it one or more times, without having to remove the box from the cupboard.

An object of the invention is to provide containers, especially for anyone who has little time available and for whom the use of scales can be an inconvenience, that allow to determine the right amount of pasta or other dry food to be cooked during removal of the product from the sales package.

This aim, this object, and others which will be described hereafter are achieved by the packaging containers according to the present invention, preferably made of cardboard or other rigid material and in a prism-like rectangular shape, characterized in that they have, on at least one of the oppositely arranged faces, an inspection port which is closed with transparent material and is flanked by a graduated scale to be used to determine, with reference to the level that has been reached, the weight of the contained product and any corresponding calories.

Advantageously, according to the present invention, the containers comprise inspection ports with easily readable graduation, characterized in that one or more inspection ports are provided in one or two walls of the container made of cardboard or other opaque material as an alternative or in addition to the parallel segments of a conventional printed or screen-printed graduated scale in order to determine the weight of the product with reference to the level it reaches in the container after taking part of it one or more times, said inspection ports being closed with transparent material and being shaped and/or arranged so that they directly form the succession of elevation references proximate to which the weight and any calories of the product that reaches that level is to be indicated.

BRIEF DESCRIPTION OF THE DRAWINGS

In order to achieve all this, particular solutions have been devised and will be described with the aid of the accompanying figures, given merely by way of non-limitative example, wherein.

DESCRIPTION OF THE PREFERRED EMBODIMENTS

As clearly illustrated in the enclosed drawings, a main characteristic of the present invention is that, on at least one face of the packaging box for pasta or other dry food, an inspection port is provided, which is closed with transparent material and is flanked by a graduated scale for determining the weight of the product contained with reference to the volume and level reached after each removal. Obviously, the graduated scale also allows to perform dosage of the individual removed amounts simply by interrupting the exit of the product when the level of the amount remaining in the box matches a level set beforehand by subtraction.

An additional graduated scale might indicate the corresponding calories for a type of food in the same manner used for its quantity, i.e. with reference to the volume and level of the product contained in the box.

The inspection port and the associated graduated scale might also be provided on two opposite faces, mainly to allow to measure the amounts taken while holding the box either with the left hand or with the right hand.

Figure 1:
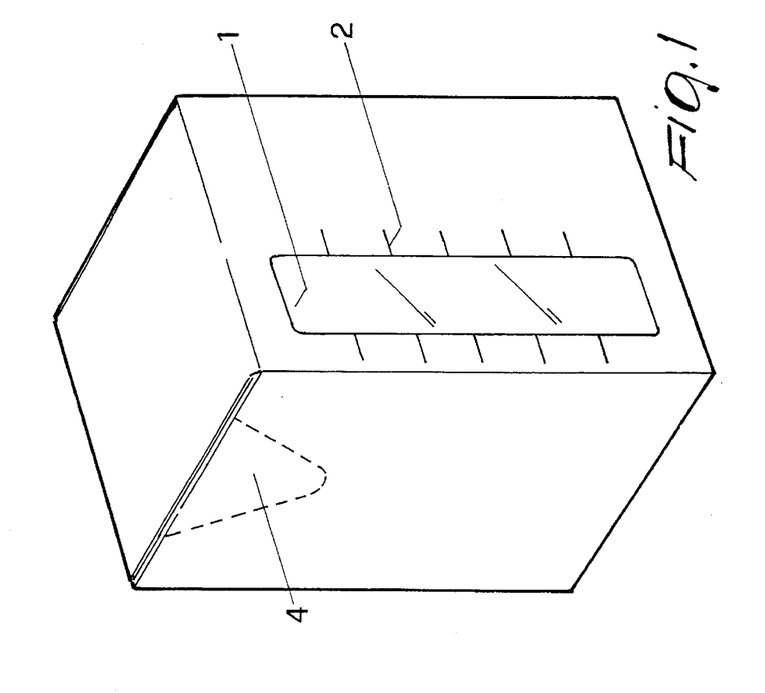
FIGS. 1 and 2 are two axonometric views of an improved box for short pasta, rice, or other products, preset for lateral emptying.
Figure 2:
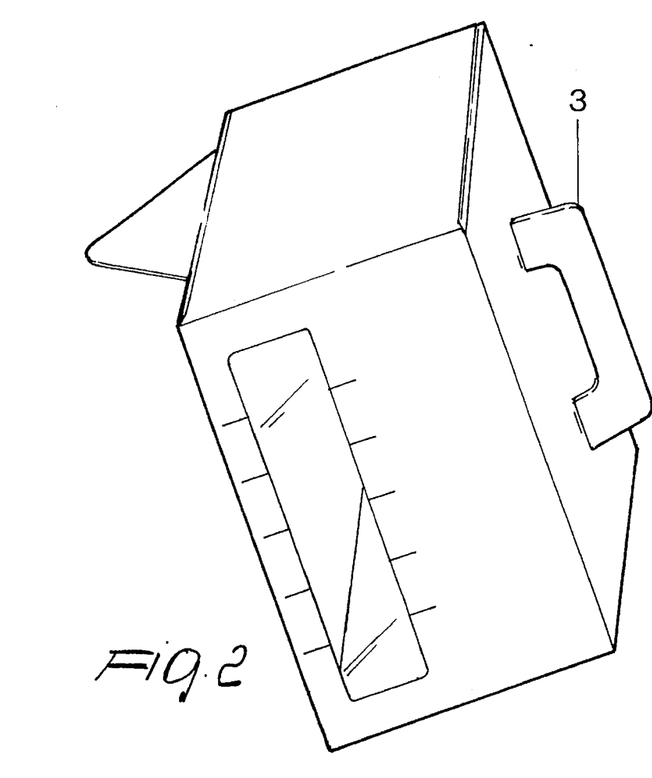

By observing the embodiment of FIGS. 1 and 2 in detail it is evident that said embodiment, which is particularly suitable for short pasta and rice, consists of a box having a rectangular prism-like shape; the transparent port 1 and the graduated scale 2 are provided longitudinally on one of its faces.

The handle 3 and a tear-open portion or tab 4 are located on two other mutually opposite faces; said tab must be lifted to free the outlet, which is located proximate to the top face of the box, since otherwise the exit of many types of short pasta might be hindered by the entanglement and weight of the overlying product.

After each removal, which can be performed by gripping the box and tilting it like a jug, the closure can be restored by fixing the tab 4 with an adhesive label.

Figure 3:
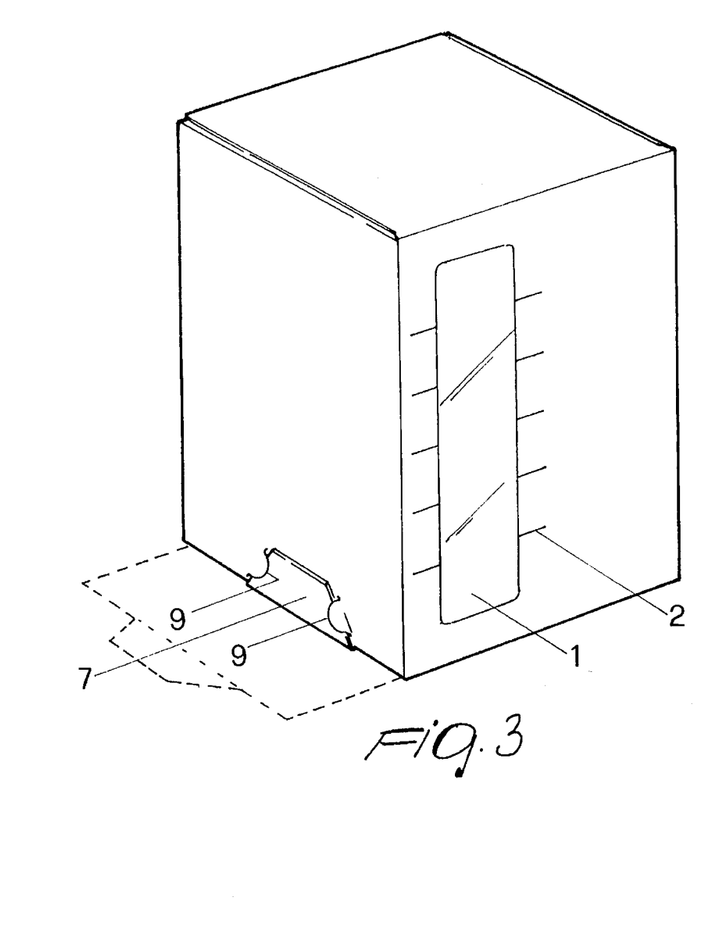
FIGS. 3 and 4 are axonometric views of an improved box for short pasta, rice, or other products, preset for emptying from the bottom.
Figures 4, 5:
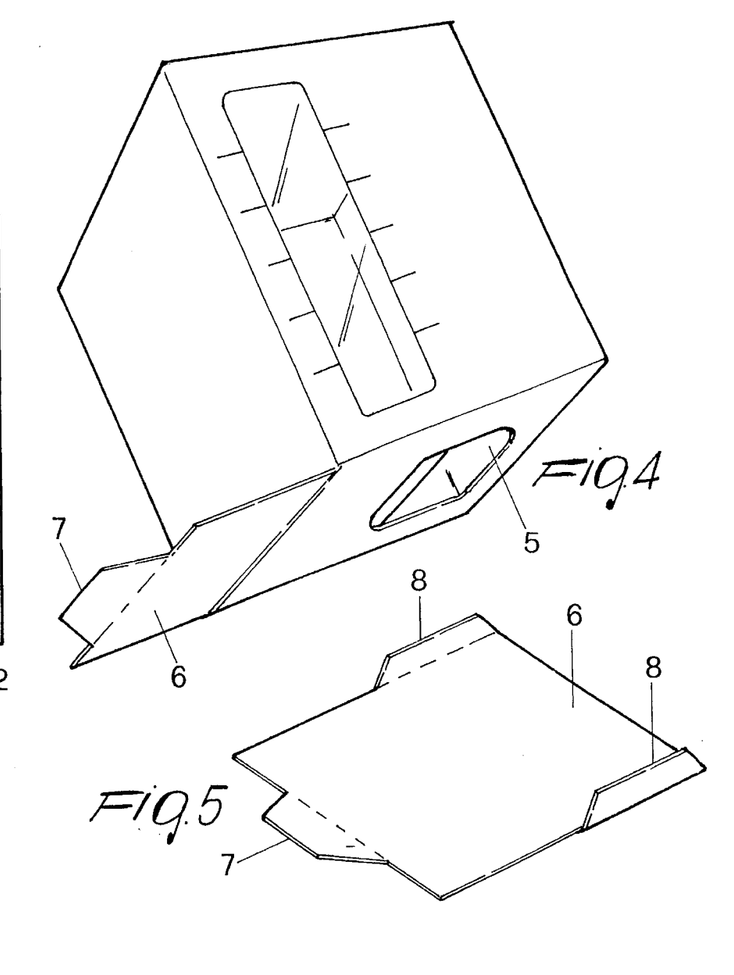
FIG. 5 is an axonometric view of the sliding closure element of the box of FIGS. 3 and 4.

The embodiment of FIGS. 3 and 4 differs from the preceding one since the product is removed through the outlet 5, which is located in the bottom face of the box and is closed by a sliding element 6 that has a flap 7 for gripping it with two fingers when opening and closing said outlet.

Two curved slits 9, provided proximate to the bottom on the face that lies opposite to the face where the handle is located, allow to fix the flap 7 when the sliding element 6 is in closed position (FIG. 3). The folded wings 8 that rise on both sides of said element 6 furthermore allow extraction only until the outlet 5 is fully open; the size of said outlet can furthermore be adjusted so as to reduce the rate at which the product exits, in order to provide, with the aid of the graduated scale, better dosage of the quantity to be removed.

As regards the outlet 5 of the above described embodiment, said outlet is already cut in the flap that overlap to form the bottom of the box, except for the outer flap, where in order to provide tamper-evident closure the outlet can be completed when the product is removed for the first time, by removing a preset tear-off portion.

Figure 6:
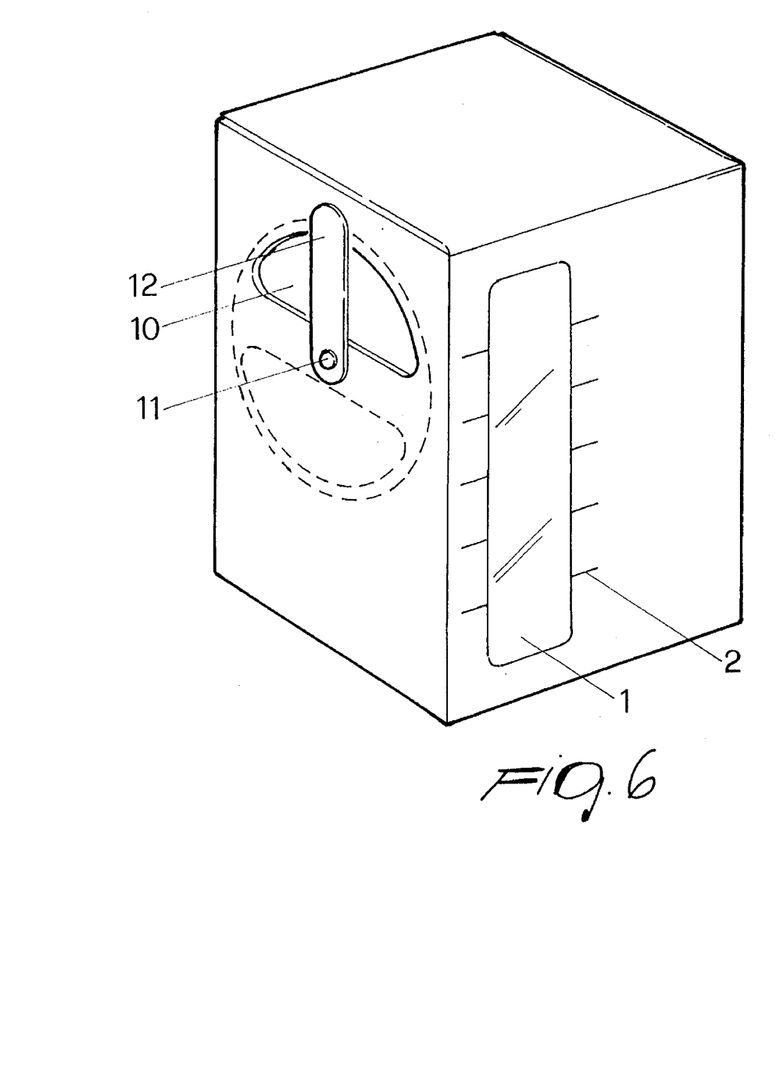
FIGS. 6 and 7 are axonometric views of two improved boxes for short pasta, rice, or other products, whose outlet is located laterally in FIG. 6 and at the bottom in FIG. 7 and is closed by rotating element.
Figure 7:
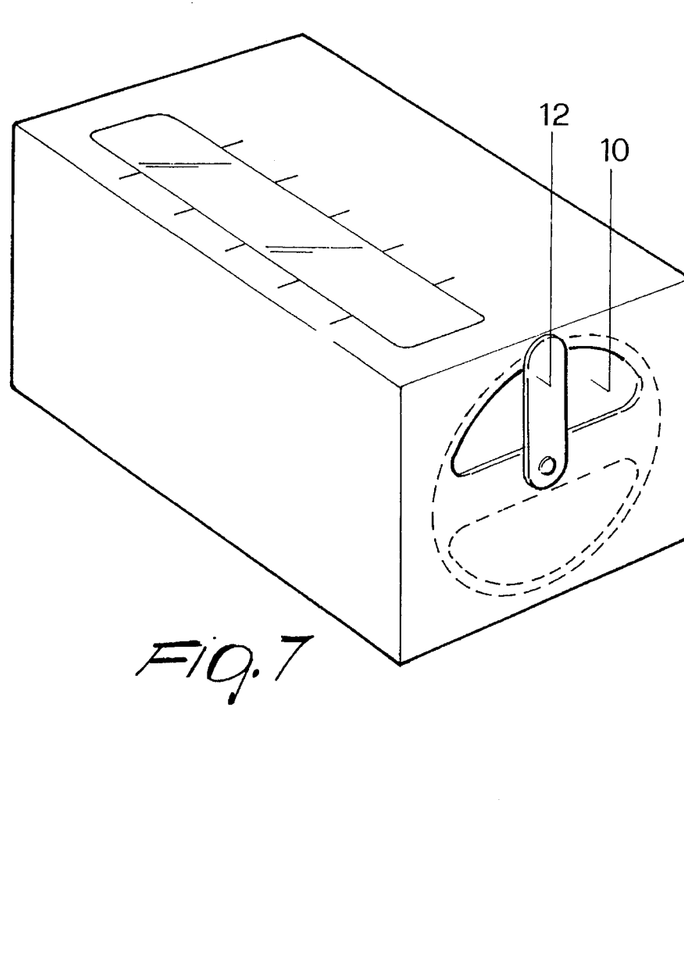

The embodiments of FIGS. 6 and 7, which are partly similar to the embodiments already described since they are likewise meant to package short pasta and rice, differ from the preceding ones because the outlet, located either at the upper part of a face (FIG. 6) or on the bottom (FIG. 7), is closed by a rotating element 10 which is pivoted at 11 and is rigidly coupled to an actuation lever 12 located outside the container.

The rotating element 10 is shaped so as to pass from the closed position to the open position and vice versa with a rotation through 180° performed by means of the lever 12, which is connected to the element 10 so as to surmount the outlet when said outlet is closed.

Figure 8:
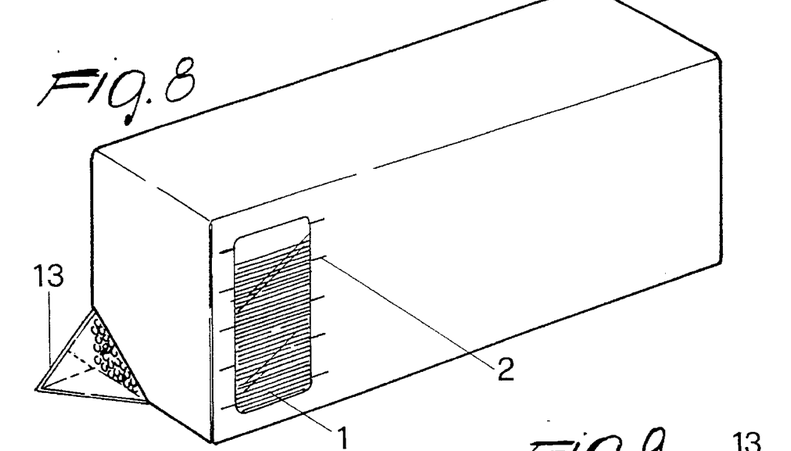
FIG. 8 is an axonometric view of an improved box for spaghetti and other long pasta, in the configuration for product removal.
Figure 9:
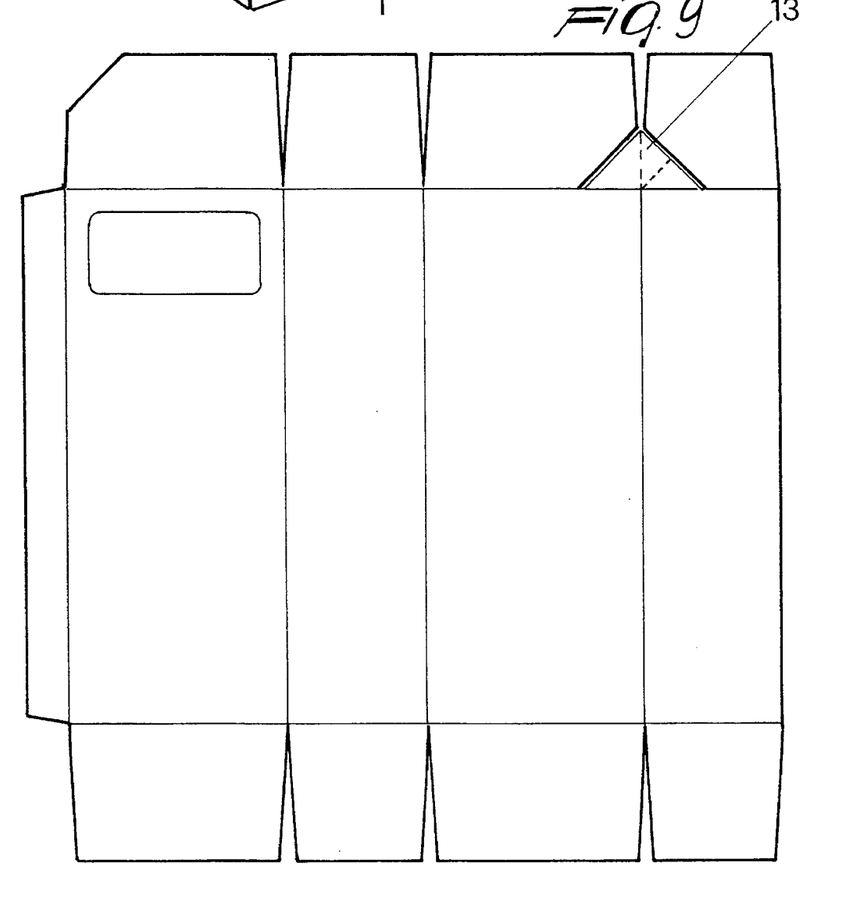
FIG. 9 is a view of the improved box of FIG. 8, unfolded flat.

Differently from the preceding examples, the example shown in FIGS. 8 and 9 is meant to package spaghetti and other long pasta, and accordingly the inspection port 1 and the graduated scale 2 are arranged parallel to the shorter sides of the affected face. In this case, the product can be removed exclusively from one of the two end faces of the rectangular prism-like box and through a preferably triangular corner opening whose size is set so that individual preset amounts can be removed.

Obviously, after one or more removals it is sufficient to place the box horizontally so that its inspection port is vertical in order to know the remaining amount of pasta by means of the graduated scale.

As regards the corner opening for removing the pasta, the embodiment of FIGS. 8 and 9 proposes the formation, astride of two of the four flaps meant to mutually overlap to close one of the end faces of the box, of a triangular tab 13 which is meant to form a sort of spout when open (FIG. 8) and is meant to be folded to shield said opening.

Figure 10:
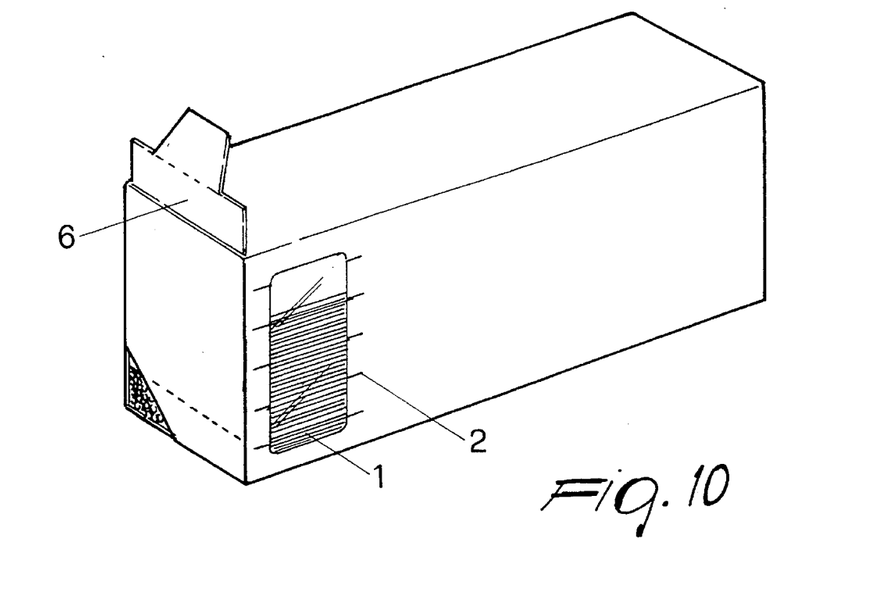
FIGS. 10 and 11 are axonometric views of two further embodiments of an improved box for spaghetti and other long pasta in the configuration for product removal.

As an alternative to the folding spout 13, the embodiment of FIG. 10 uses a sliding element 6 which is fully similar to the one used in the embodiment of FIGS. 3 to 5, although in this specific case it is associated with a corner opening.

Figure 11:
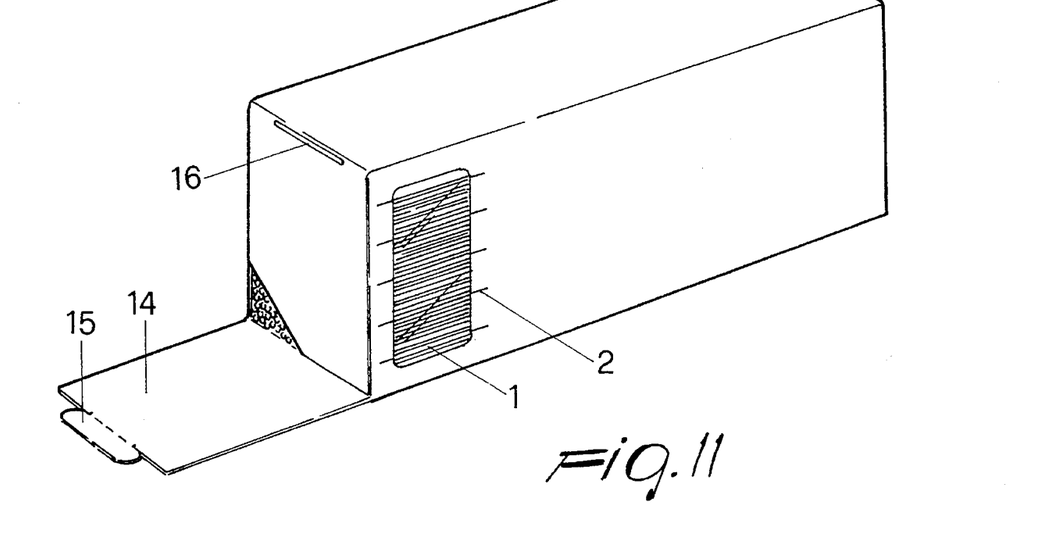

In the embodiment of FIG. 11, also meant for spaghetti or other long pasta, the corner opening is shielded by the flap 14, the tab 15 whereof engages in the slot 16. Accordingly, in order to remove the product it is sufficient to release and overturn the flap 14, which can be fixed against one face of the box by the same hand that holds said box.

It should be noted that although all the illustrated embodiments for long pasta (FIGS. 8–10–11) show triangular corner openings, the boxes of FIGS. 10 and 11 might have rectangular openings, preferably with three sides located so as to overlap the perimeter of the end face of the box.

It should be added that the graduated quantity scale might be provided directly on the transparent material which closes the inspection port.

The inventive concept of the present invention shown in the embodiments of FIGS. 12 to 25 is essentially based on the provision, as an alternative or in addition to the parallel segments of a simply printed or screen-printed graduated scale, one or more inspection ports which are closed with transparent material and are shaped and/or arranged so as to directly form the sequence of elevation references next to which the weight and any calories of the product that reaches that level are to be indicated.

Figure 12:
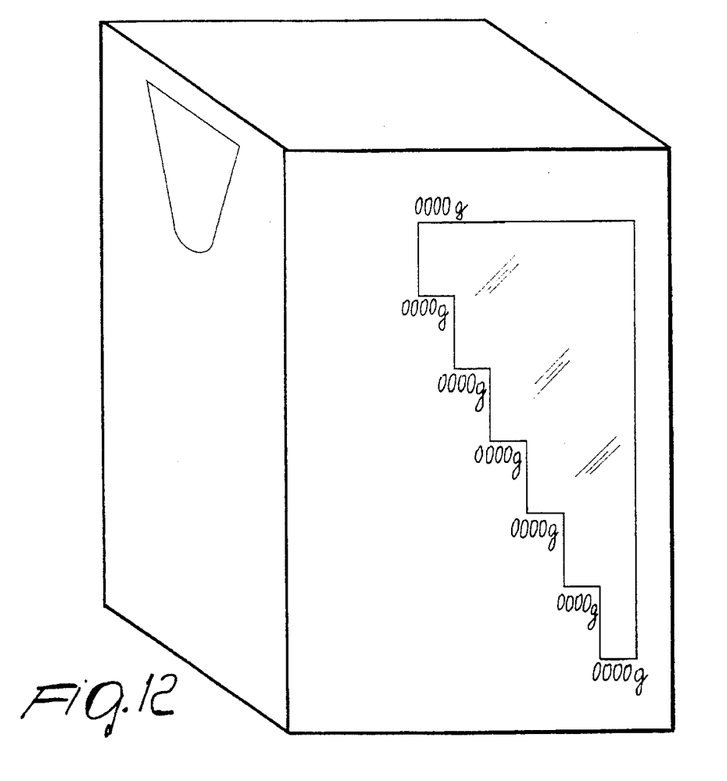
FIG. 12 is an axonometric view of a dosage container for short pasta and rice which is provided with an inspection port with easily readable graduation.

The example of FIG. 12, which illustrates a cardboard container for short pasta or rice with a lateral outlet that is closed by means of an appropriate lifting tab, shows that the inspection port, which is of course made of transparent material, is characterized in that it is provided with a series of steps the vertical portions whereof are identical; each one defines a multiple of the initial quantity of the product. Accordingly, each horizontal portion of said port represents a level of the new graduated scale and as such is completed by the corresponding numeric references.

Figure 13:
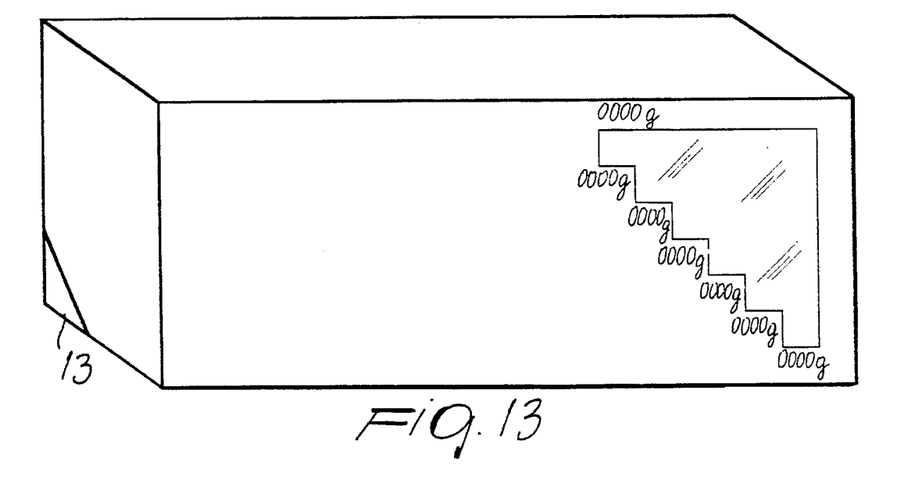
FIG. 13 is an axonometric view of a dosage container for spaghetti and other long pasta, provided with an inspection port with easily readable graduation.
Figure 14:
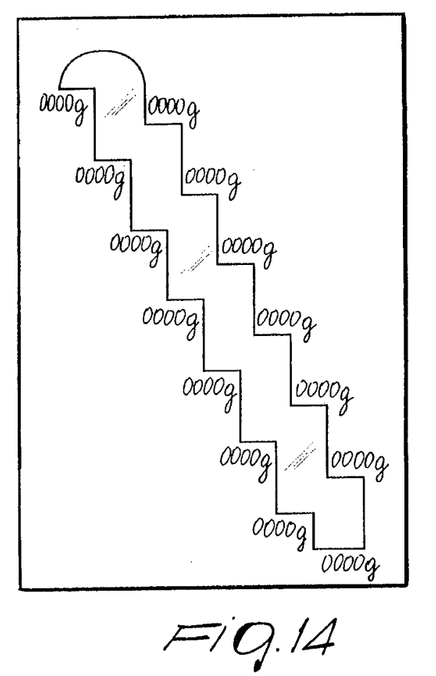
FIGS. 14 to 25 are views of a corresponding number of embodiments of the inspection ports with easily readable graduation.
Figure 15:
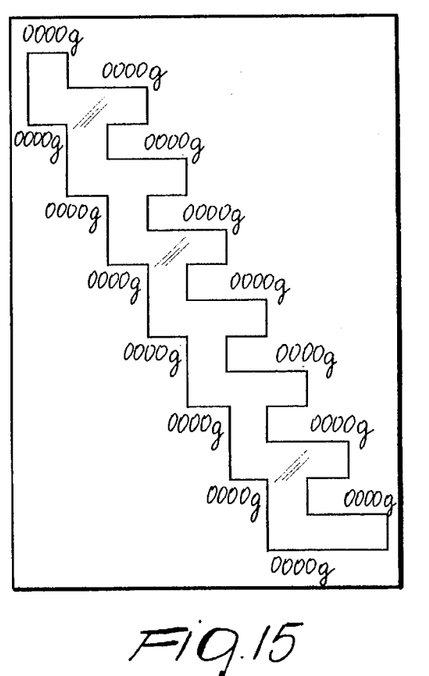
Figure 16:
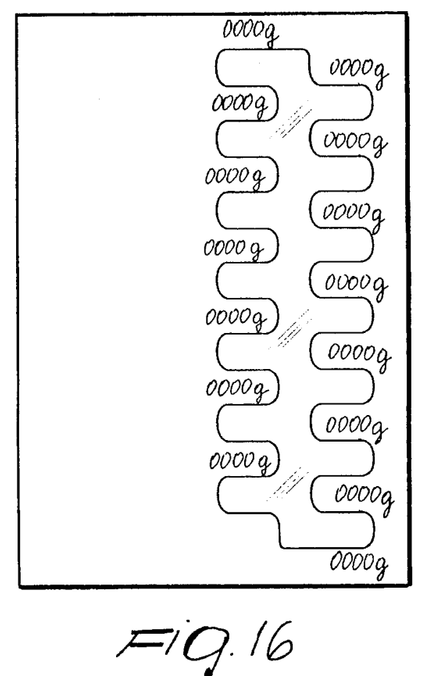
Figure 17:
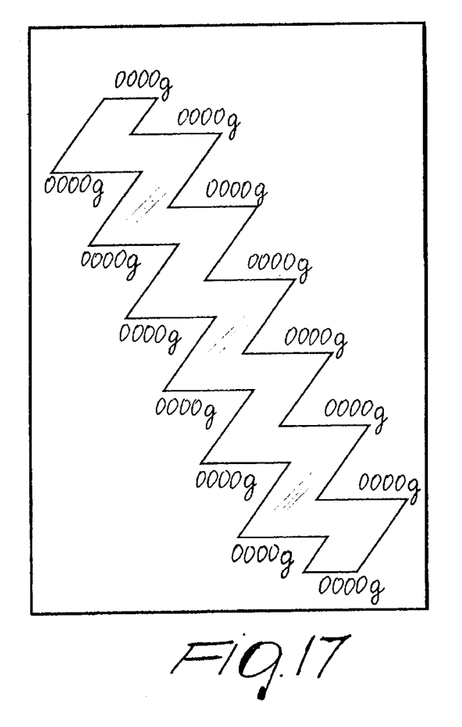
Figure 18:
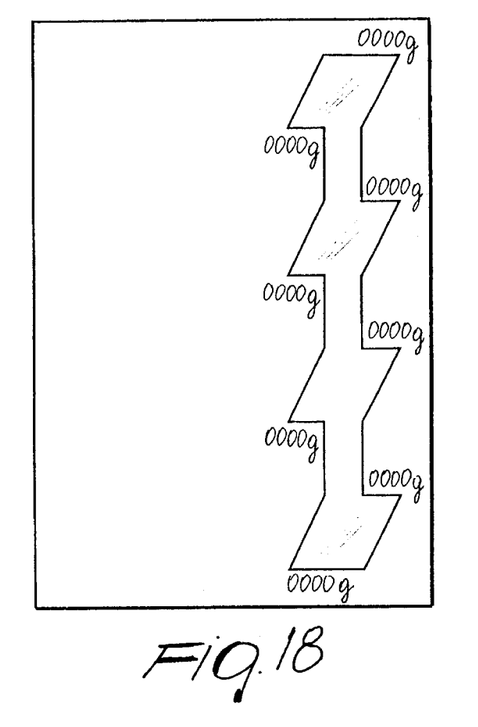
Figure 19:
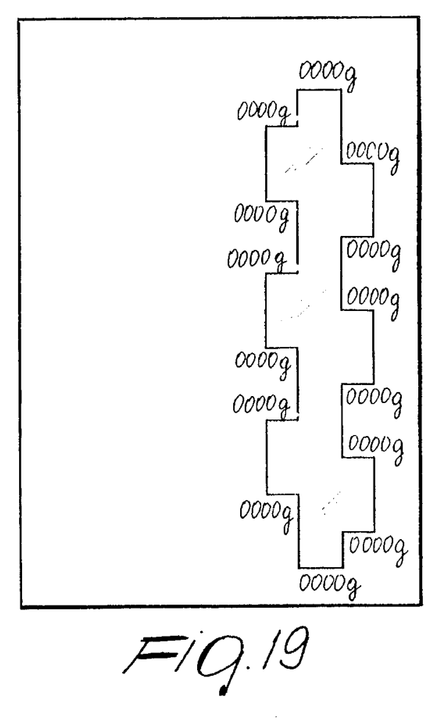

The embodiment of FIG. 13 illustrates a cardboard container for spaghetti or other long pasta that can be removed in rations equal to a preset quantity; the appropriate lateral outlet is sized for this purpose, and this embodiment has an inspection port which is made of transparent material and is similar to the port of figure 12, although in this case it is arranged transversely to the box.

In the embodiments of FIGS. 14 to 19 the inspection port, made of transparent material, is essentially delimited by two broken-line profiles; each profile has horizontal reference portions, which are completed by numeric indications regarding the weight and any corresponding calories and are located at intermediate elevations with respect to the horizontal portions of the other profile.

Figure 20:
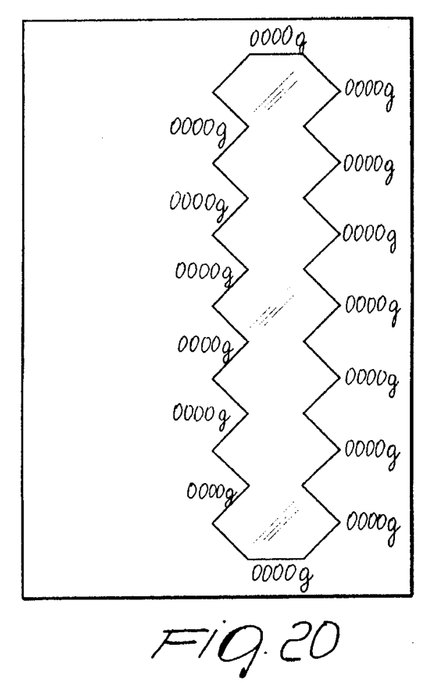
Figure 21:
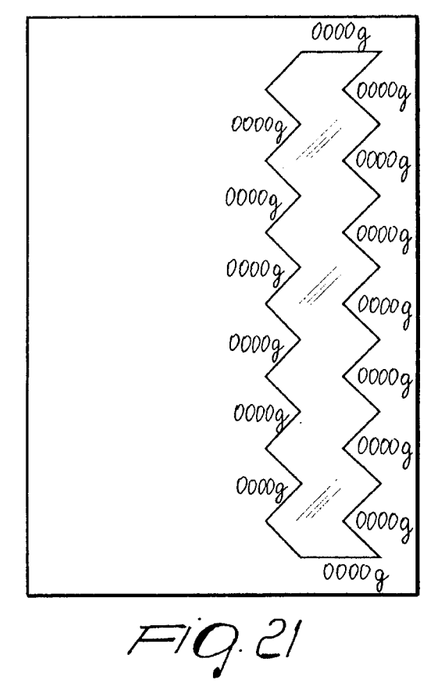

In the embodiments of FIGS. 20 and 21 the inspection port, made of transparent material, is delimited by two sawtooth profiles in which the alternately protruding and recessed corners form the reference levels marked by the numeric indications.

Figure 22:
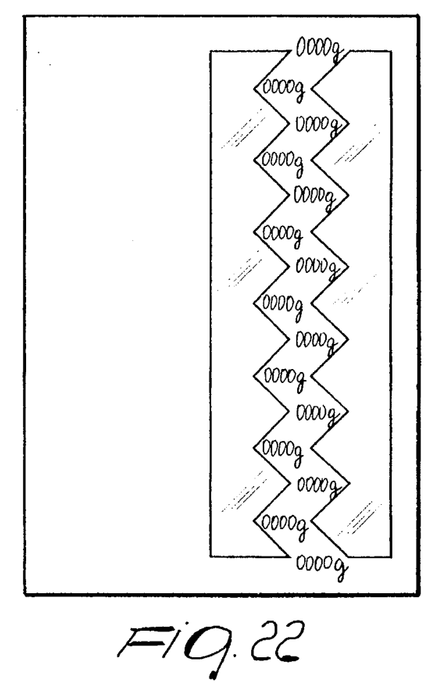

The embodiment of FIG. 22 shows an inspection port that is divided, along its entire elevation, by a zigzag band obtained from the cardboard container in order to clearly indicate, with the corners that protrude on its two sides, the levels marked by the numeric references.

Figure 23:
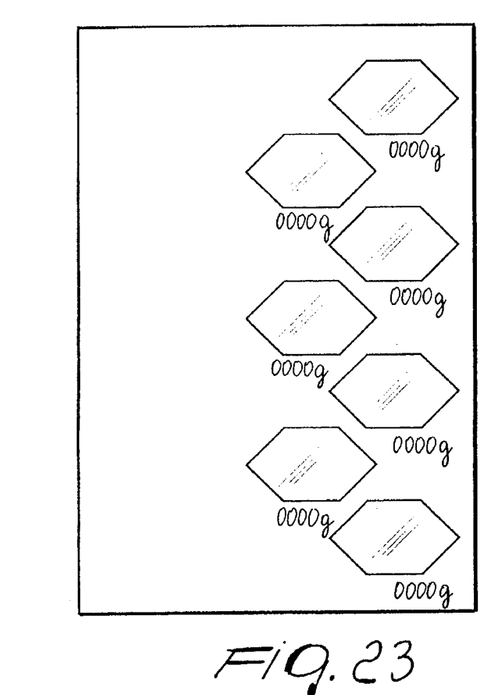
Figure 24:
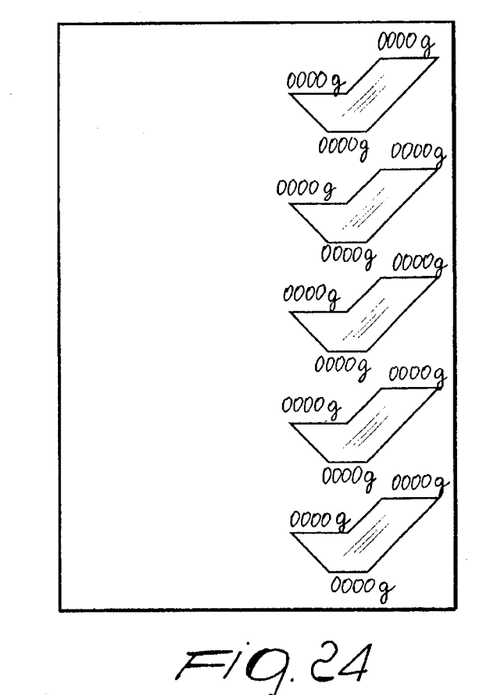

In the embodiment of FIG. 23, the graduation is provided by multiple inspection ports which are shaped like an irregular convex polygon and have two horizontal sides that form the levels marked by the numeric references.

In the embodiment of FIG. 24 the graduation is again provided by multiple inspection ports which however, in this case, are shaped like an irregular concave polygon with three horizontal sides that form a corresponding number of levels marked by the numeric references.

Figure 25:
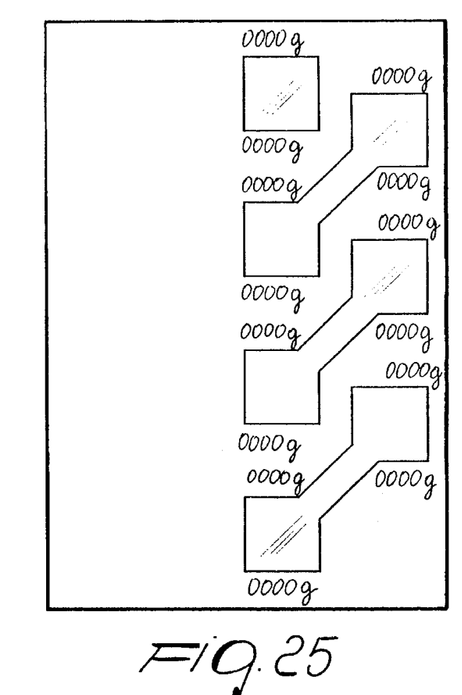

In the embodiment of FIG. 25, the graduation is provided by multiple inspection ports which have a substantially quadrangular shape, are arranged on two columns, and are vertically staggered so as to form, with their respective horizontal sides, a sequence of levels arranged in an arithmetic progression. All but one of the ports of the two columns are furthermore joined at an angle in pairs by a cut through which it is possible to view the intermediate levels.

It should be noted that although most of the illustrated examples show the front side of a container for short pasta or rice such as the one shown in FIG. 12, the same solutions also apply to containers meant to package spaghetti or other long pasta.

Furthermore, as mentioned initially, the broken-line profiles used here for the easily readable graduation of the inspection ports, might also be completed by horizontal reference segments for the graduations that are intermediate with respect to the graduations indicated by the profile.

Finally, without altering the already illustrated and described characteristics, the entire box or part thereof might be made of transparent material on which it is possible to provide even more than one graduated scale indicating the quantities and any corresponding calories, said scales being obviously orientated according to the type of packaged product.

Finally, it should be added that without altering the illustrated and described generic characteristics the invention can be susceptible of numerous modifications and variations, which are in any case comprised within the scope of the present invention.

What is claimed is:

1. Packaging containers, particularly suitable for pasta, rice, and other dry food products, made of cardboard or other rigid material and in a rectangular prism-like shape, comprising, on at least one of their opposite faces, an inspection port which is closed with transparent material, said inspection port being flanked by a graduated scale, said scale being graduated to determine, according to the level reached by the product, a weight of the contained product and a value of corresponding calories.

2. Containers according to claim 1, wherein the inspection port and the graduated scale are arranged longitudinally with respect to the affected face so as to determine the quantity when the box is vertical.

3. Containers according to claim 2, wherein a tear-open tab is provided in a face which is normal with respect to the face or faces provided with an inspection port and a graduated scale, said face on which the tab is provided being opposite to a further face provided with a handle, said tab reaching the upper edge of said face on which it is provided and being adapted to be lifted to free an outlet through which the necessary product is removed by appropriately tilting the container.

4. Containers according to claim 3, wherein the removal outlet is located in the lower base, said outlet being closed by a sliding element, said sliding element being limited in its outgoing motion by lateral wings, said wings being folded upwardly, and wherein said sliding element can be actuated by means of a flap, said flap being fixable in closed position against the face that lies opposite to the one provided with the handle, and said container being provided in engagement points with said flap with two curved slits.

5. Containers according to claim 4, wherein the removal outlet is closed by a rotating element, said rotating element being pivoted at the container and being rigidly coupled to an actuation lever, said actuation lever being located outside the box and being rotatable through 180° to move the rotating element from a closed position to an open position and vice versa.

6. Containers according to claim 1, wherein the inspection port and the graduated scale are provided transversely to the affected face, i.e. parallel to a shorter side of said face, in order to determine a quantity of product when the container is horizontal.

7. Containers according to claim 1, wherein removal of product is provided in one of the two end faces of the container by means of a triangular corner outlet, said outlet being sized for individual removals of a preset amount.

8. Containers according to claim 7, wherein the corner outlet is shielded by folding a triangular tab, said tab being formed astride two of four flaps which are necessarily overlapped to form an end face of the container, said tab forming a sort of spout when open.

9. Containers according to claim 7, wherein the corner outlet is shielded by a sliding element.

10. Containers according to claim 7, wherein the corner outlet is shielded by an overturning flap, said flap comprising a tab, and said tab being engaged in a slot for closing.

11. Containers according to claim 1, wherein the entire box, or a part thereof, can be made of transparent material on which one or more graduated scales are formed, said scales indicating the product quantities and any corresponding calories, and said scales being orientated according to the type of packaged product.

12. Inspection ports, with easily readable graduation, for dosage-based packaging containers of pasta, rice, and other dry food products, wherein in order to determine a weight of the product according to a level reached in the container after one or more partial removals, one or more inspection ports are provided on one or two walls of the container, said container being made of cardboard or other opaque material, and wherein as an alternative to parallel segments of a printed or screen-printed graduated scale, said inspection ports being closed with transparent material, said transparent material being shaped and/or arranged so as to directly provide a succession of elevation references proximate to which the weight and any calories of the product that reaches that level are to be indicated.

13. Inspection ports according to claim 12, wherein in addition to parallel segments of a printed or screen-printed graduated scale, said inspection ports are closed with transparent material, said transparent material being shaped and/or arranged so as to directly provide a succession of elevation references proximate to which the weight and any calories of the product that reaches that level are to be indicated.

14. Inspection ports according to claim 12, wherein an edge of the inspection port is partially shaped so as to form a series of steps that have a constant vertical extension and form a sequence of reference levels which are completed by respective numeric indications related to the weight and optionally the calories as well.

15. Inspection ports according to claim 12, wherein the inspection port is shaped so that it is delimited by two broken-line profiles, each profile having horizontal reference portions which are completed by numeric indications regarding the quantity of product and any corresponding calories, said reference portions being located at an intermediate elevation with respect to levels defined by the horizontal reference portions of the other profile.

16. Inspection ports according to claim 12, wherein the inspection port is delimited by two saw-toothed profiles, said profiles having alternately protruding and recessed corners which form reference levels marked by numeric indications.

17. Inspection ports according to claim 12, wherein the inspection port is divided, along its entire vertical elevation, by a zigzag band of the opaque container in order to indicate, with corners protruding on either side, levels marked by numeric references.

18. Inspection ports according to claim 12, wherein said graduated scale is provided by multiple inspection ports, said ports being shaped as a polygon, said ports being arranged so that horizontal sides thereof form a sequence of reference levels in an arithmetic progression, said levels being marked by appropriate numeric indications.

19. Inspection ports according to claim 12, wherein the graduated scale is provided by multiple inspection ports which are arranged on two columns, said ports being vertically staggered and wherein said ports are joinable in pairs and have a slit through which it is possible to view intermediate levels of the product.

20. Inspection ports according to claim 12, wherein the broken-line profiles used for the easily readable graduation can be completed by horizontal reference segments for the graduations, said segments being intermediate to the segments indicated by the profile.

* * * * *